United States Patent
Ueda

(10) Patent No.: US 11,280,372 B2
(45) Date of Patent: Mar. 22, 2022

(54) BEARING STRUCTURE

(71) Applicant: IHI Corporation, Koto-ku (JP)

(72) Inventor: Akihiro Ueda, Tokyo (JP)

(73) Assignee: IHI Corporation, Koto-ku (JP)

( * ) Notice: Subject to any disclaimer, the term of this patent is extended or adjusted under 35 U.S.C. 154(b) by 0 days.

(21) Appl. No.: 16/923,646

(22) Filed: Jul. 8, 2020

(65) Prior Publication Data

US 2020/0340526 A1 Oct. 29, 2020

Related U.S. Application Data

(63) Continuation of application No. PCT/JP2019/000116, filed on Jan. 7, 2019.

(30) Foreign Application Priority Data

Feb. 8, 2018 (JP) .............................. JP2018-021039

(51) Int. Cl.
*F16C 33/10* (2006.01)
*F01D 25/16* (2006.01)
*F16C 17/10* (2006.01)

(52) U.S. Cl.
CPC ............ *F16C 33/10* (2013.01); *F01D 25/166* (2013.01); *F16C 17/107* (2013.01);
(Continued)

(58) Field of Classification Search
CPC ........ F16C 17/10; F16C 17/107; F16C 17/18; F16C 27/02; F16C 33/10; F16C 33/106; F16C 2360/24; F01D 25/16; F01D 25/166; F01D 25/18; F05D 2220/40; F05D 2240/50; F05D 2240/53; F05D 2240/54; F05D 2260/98; F02B 39/00

See application file for complete search history.

(56) References Cited

U.S. PATENT DOCUMENTS 3,390,926 A * 7/1968 Woollenweber, Jr. ...................... F01D 25/166 384/287
4,240,678 A 12/1980 Sarle et al.
(Continued)

FOREIGN PATENT DOCUMENTS

CN 88 1 01625 A 12/1988
CN 1273622 A 11/2000
(Continued)

OTHER PUBLICATIONS

Combined Chinese Office Action and Search Report dated Jun. 2, 2021 in corresponding Chinese Patent Application No. 201980012541.7 (with English Translation of Category of Cited Documents), 10 pages.
(Continued)

*Primary Examiner* — James Pilkington
(74) *Attorney, Agent, or Firm* — Oblon, McClelland, Maier & Neustadt, L.L.P.

(57) ABSTRACT

The bearing structure includes an insertion member, which is inserted through a pin hole (insertion hole) of a bearing housing (housing) in a direction intersecting an axial direction of a shaft, has one end side inserted between a pair of radial bearing surfaces of a main body portion and another end side inserted through the insertion hole, and has a through hole passing from one end to another end.

11 Claims, 10 Drawing Sheets

(52) U.S. Cl.
CPC ...... *F05D 2220/40* (2013.01); *F05D 2240/54* (2013.01); *F16C 2360/24* (2013.01)

(56) References Cited

U.S. PATENT DOCUMENTS

| | | | |
|---|---|---|---|
| 5,993,173 | A | 11/1999 | Koike et al. |
| 10,228,019 | B2 * | 3/2019 | Uneura .................. F02B 37/00 |
| 10,520,026 | B2 * | 12/2019 | Uneura .............. F16C 33/1045 |
| 2007/0003175 | A1 | 1/2007 | Petitjean et al. |
| 2012/0237149 | A1 | 9/2012 | Uesugi |
| 2016/0348577 | A1 * | 12/2016 | Uneura .................. F02B 39/14 |
| 2017/0211616 | A1 | 7/2017 | Kojima et al. |
| 2017/0314616 | A1 | 11/2017 | Noda et al. |
| 2018/0023620 | A1 | 1/2018 | Berger et al. |
| 2018/0252265 | A1 | 9/2018 | Uneura |

FOREIGN PATENT DOCUMENTS

| | | |
|---|---|---|
| CN | 1451078 A | 10/2003 |
| CN | 101213354 A | 7/2008 |
| CN | 103492733 A | 1/2014 |
| CN | 105156462 A | 12/2015 |
| CN | 106662144 A | 5/2017 |
| CN | 107076210 A | 8/2017 |
| CN | 107429735 A | 12/2017 |
| CN | 108350932 A | 7/2018 |
| DE | 30 05 873 A1 | 9/1980 |
| DE | 10 2016 222 625 A1 | 5/2018 |
| EP | 1 896 696 B1 | 1/2014 |
| EP | 3 163 103 A1 | 5/2017 |
| EP | 3 421 825 A1 | 1/2019 |
| FR | 2 449 820 A1 | 9/1980 |
| GB | 2 049 839 A | 12/1980 |
| GB | 2 405 453 A | 3/2005 |
| JP | 52-085054 U | 6/1977 |
| JP | 55-112418 A | 8/1980 |
| JP | 09-242553 A | 9/1997 |
| JP | 2005-133635 A | 5/2005 |
| JP | 2007-023858 A | 2/2007 |
| JP | 2012-191708 A | 10/2012 |
| JP | 2012-193709 A | 10/2012 |
| JP | 2014-009622 A | 1/2014 |
| JP | 2014-034879 A | 2/2014 |
| JP | 2014-051898 A | 3/2014 |
| JP | 2014-508257 A | 4/2014 |
| JP | 2016-084738 A | 5/2016 |
| JP | 5996301 B2 | 9/2016 |
| JP | WO 2017/082166 A1 | 5/2017 |
| KR | 10-2018-0011054 A | 1/2018 |
| WO | WO 2007/005478 A1 | 1/2007 |
| WO | WO 2016/031013 A1 | 3/2016 |
| WO | WO 2016/146189 A1 | 9/2016 |
| WO | WO 2017/082166 A1 | 5/2017 |
| WO | WO 2018/091629 A1 | 5/2018 |

OTHER PUBLICATIONS

International Search Report dated Apr. 9, 2019 in PCT/JP2019/000116 filed on Jan. 7, 2019 (with English Translation), 4 pages.
Chinese Notification of Allowance and Registration dated Dec. 24, 2021 in Chinese Patent Application No. 201980012541.7 (with English Translation of Category of Cited Documents), 3 pages.

* cited by examiner

BEARING STRUCTURE

CROSS REFERENCE TO RELATED APPLICATIONS

This application is a continuation application of International Application No. PCT/JP2019/000116, filed on Jan. 7, 2019, which claims priority to Japanese Patent Application No. 2018-021039, filed on Feb. 8, 2018, the entire contents of which are incorporated by reference herein.

BACKGROUND ART

Technical Field

The present disclosure relates to a bearing structure configured to axially support a shaft.

Related Art

A bearing structure includes a bearing housing and a semi-floating bearing. The semi-floating bearing is accommodated in a bearing hole of the bearing housing. A semi-floating bearing according to Patent Literature 1 includes an annular main body portion. Two radial bearing surfaces are formed on an inner peripheral surface of the main body portion. The two radial bearing surfaces are separated from each other in an axial direction. The main body portion has an oil hole formed between the two radial bearing surfaces.

The oil hole introduces lubricating oil from an outer peripheral surface side to an inner peripheral surface side of the main body portion. The lubricating oil having been introduced to the inner peripheral surface side of the main body portion lubricates the radial bearing surfaces. Thrust bearing surfaces are formed on both end surfaces of the main body portion in the axial direction. The lubricating oil having lubricated the radial bearing surfaces lubricates the thrust bearing surfaces.

Moreover, the main body portion has communication holes. An inlet end of the communication hole is opened in the outer peripheral surface of the main body portion. An outlet end of the communication hole is opened on the innermost side of the thrust bearing surface of the main body portion in a radial direction of a shaft. The communication hole introduces the lubricating oil from the outer peripheral surface side to a thrust bearing surface side of the main body portion. As a result, an amount of the lubricating oil moving from the radial bearing surface side to the thrust bearing surface side is reduced.

CITATION LIST

Patent Literature

Patent Literature 1: WO 2017/082166 A1

SUMMARY

Technical Problem

The lubricating oil passes through the oil hole to lubricate the radial bearing surfaces. The lubricating oil having lubricated the radial bearing surfaces lubricates the thrust bearing surfaces. Moreover, the lubricating oil passes through the communication holes to lubricate the thrust bearing surfaces. In this case, design for supplying the lubricating oil having an optimal oil amount and an optimal oil temperature to both of the radial bearing surfaces and the thrust bearing surfaces to improve performance of the bearing is complicated.

An object of the present disclosure is to provide a bearing structure capable of improving performance of a bearing.

Solution to Problem

In order to solve the above-mentioned problem, according to one mode of the present disclosure, there is provided a bearing structure, including: a housing which has a bearing hole having an oil passage opened therein; a bearing member, which is provided in the bearing hole, and includes a main body portion through which a shaft is inserted; a pair of radial bearing surfaces, which are formed on an inner peripheral surface of the main body portion, and are respectively located on one side and on another side in an axial direction of the shaft with respect to an opening of the oil passage; a thrust bearing surface which is formed on at least one of both end surfaces of the main body portion in the axial direction of the shaft; a communication hole, which is formed in the main body portion, and has one end opened in an outer peripheral surface of the main body portion and another end opened in the thrust bearing surface, in the radial bearing surface, or between the thrust bearing surface and the radial bearing surface; and an insertion member, which is inserted through an insertion hole of the housing in a direction intersecting the axial direction of the shaft, has one end side inserted between the pair of radial bearing surfaces of the main body portion and another end side inserted through the insertion hole, and has a through hole passing from one end to another end.

The main body portion may include a groove, which is formed in the radial bearing surface, and extends in the axial direction.

The main body portion may include a groove, which is formed in the thrust bearing surface, and extends in a radial direction of the main body portion.

The main body portion may further include a groove, which is formed so as to be continuous with the thrust bearing surface and the radial bearing surface, extends in the radial direction of the main body portion and the axial direction of the shaft, and has the another end of the communication hole opened therein.

The main body portion may further include a groove, which is formed between the thrust bearing surface and the radial bearing surface, extends in a circumferential direction of the main body portion, and has the another end of the communication hole opened therein.

The insertion member may be formed of an elastic body.

The number of the communication holes formed on a turbine side of the shaft in the main body portion may be larger than the number of the communication holes formed on a compressor side of the shaft in the main body portion.

Effects of Disclosure

According to the present disclosure, it is possible to improve the performance of the bearing.

DESCRIPTION OF EMBODIMENTS

Figure 1:
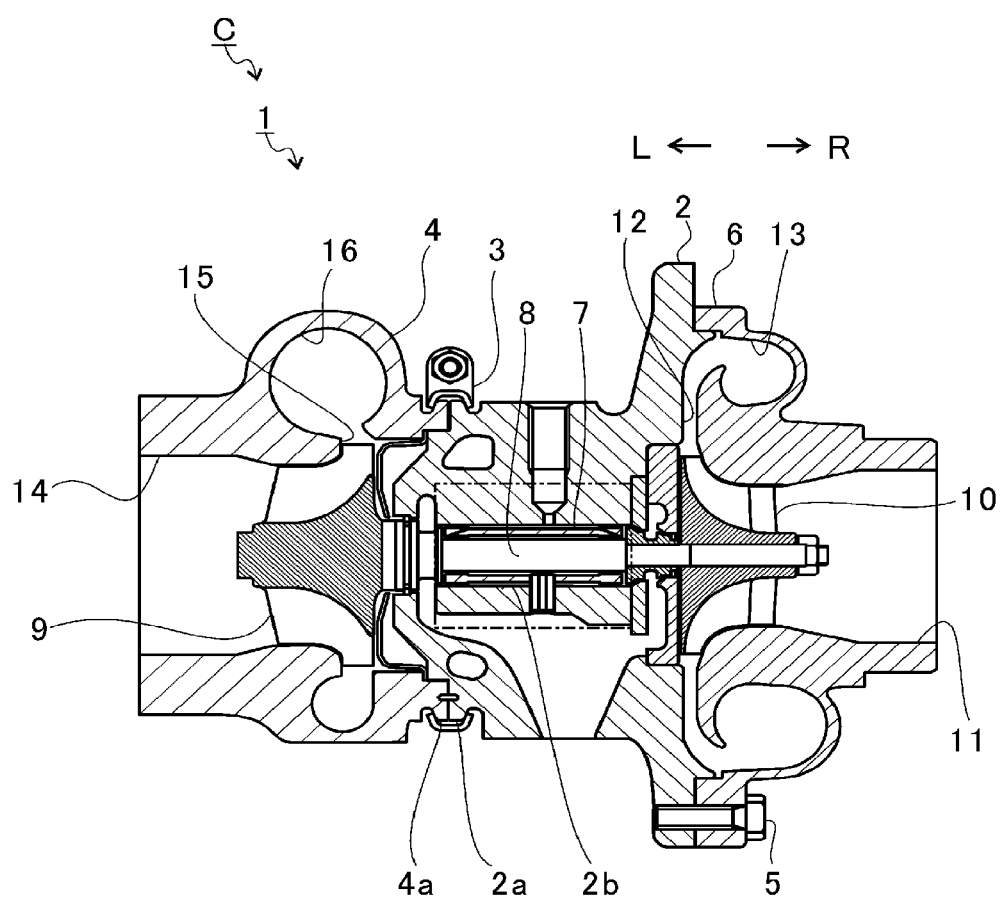
FIG. 1 is a schematic sectional view for illustrating a turbocharger.

Now, with reference to the attached drawings, embodiments of the present disclosure are described in detail. The dimensions, materials, and other specific numerical values represented in the embodiments are merely examples used for facilitating the understanding, and do not limit the present disclosure otherwise particularly noted. Elements having substantially the same functions and configurations herein and in the drawings are denoted by the same reference symbols to omit redundant description thereof. Illustration of elements with no direct relationship to the present disclosure is omitted.

FIG. 1 is a schematic sectional view for illustrating a turbocharger C. In the following, a direction indicated by the arrow L illustrated in FIG. 1 corresponds to a left side of the turbocharger C. A direction indicated by the arrow R illustrated in FIG. 1 corresponds to a right side of the turbocharger C. As illustrated in FIG. 1, the turbocharger C includes a turbocharger main body 1. The turbocharger main body 1 is formed of a bearing housing 2 (housing), a turbine housing 4, and a compressor housing 6. The turbine housing 4 is coupled to a left side of the bearing housing 2 by a fastening mechanism 3. The compressor housing 6 is coupled to a right side of the bearing housing 2 by fastening bolts 5. The bearing housing 2, the turbine housing 4, and the compressor housing 6 are integrated.

A protrusion 2a is formed on an outer peripheral surface of the bearing housing 2. The protrusion 2a is formed on the turbine housing 4 side. The protrusion 2a protrudes in a radial direction of the bearing housing 2. A protrusion 4a is formed on an outer peripheral surface of the bearing housing 4. The protrusion 4a is formed on the bearing housing 2 side. The protrusion 4a protrudes in a radial direction of the turbine housing 4. The protrusions 2a and 4a of the bearing housing 2 and the turbine housing 4 are band-fastened by the fastening mechanism 3. The fastening mechanism 3 is formed of a G coupling configured to clamp the protrusions 2a and 4a.

A bearing hole 2b is formed in the bearing housing 2. The bearing hole 2b passes through the bearing housing 2 in a right-and-left direction of the turbocharger C. A semi-floating bearing 7 (bearing member) is provided in the bearing hole 2b. The semi-floating bearing 7 axially supports the shaft 8 so that the shaft 8 is rotatable. A turbine impeller 9 is provided at a left end portion of the shaft 8. The turbine impeller 9 is accommodated in the turbine housing 4 so as to be rotatable. A compressor impeller 10 is provided at a right end portion of the shaft 8. The compressor impeller 10 is accommodated in the compressor housing 6 so as to be rotatable.

An intake port 11 is formed in the compressor housing 6. The intake port 11 is opened on the right side of the turbocharger C. The intake port 11 is connected to an air cleaner (not shown). A diffuser flow passage 12 is defined under a state in which the bearing housing 2 and the compressor housing 6 are coupled to each other by the fastening bolts 5. The diffuser flow passage 12 is defined by opposed surfaces of the bearing housing 2 and the compressor housing 6. The diffuser flow passage 12 increases pressure of air. The diffuser flow passage 12 has an annular shape defined so as to extend from an inner side toward an outer side in a radial direction of the shaft 8 (hereinafter simply referred to as "radial direction"). The diffuser flow passage 12 communicates with the intake port 11 on a radially inner side through intermediation of the compressor impeller 10.

A compressor scroll flow passage 13 is formed in the compressor housing 6. The compressor scroll flow passage 13 has an annular shape. The compressor scroll flow passage 13 is located, for example, on a radially outer side with respect to the diffuser flow passage 12. The compressor scroll flow passage 13 communicates with an intake port of an engine (not shown) and the diffuser flow passage 12. When the compressor impeller 10 rotates, the air is sucked from the intake port 11 into the compressor housing 6. The sucked air is pressurized and accelerated in the course of flowing through blades of the compressor impeller 10. The air having been pressurized and accelerated is increased in pressure in the diffuser flow passage 12 and the compressor scroll flow passage 13. The air having been increased in pressure is led to the intake port of the engine.

A discharge port 14 is formed in the turbine housing 4. The discharge port 14 is opened on the left side of the turbocharger C. The discharge port 14 is connected to an exhaust gas purification device (not shown). Moreover, a connection passage 15 and a turbine scroll flow passage 16 are formed in the turbine housing 4. The turbine scroll flow passage 16 has an annular shape. The turbine scroll flow passage 16 is located, for example, on an outer side with respect to the connection passage 15 in a radial direction of the turbine impeller 9. The turbine scroll flow passage 16 communicates with a gas inflow port (not shown). Exhaust gas discharged from an exhaust manifold (not shown) of the engine is led to the gas inflow port. The connection passage 15 connects the turbine scroll flow passage 16 and the discharge port 14 to each other. Thus, the exhaust gas having been led from the gas inflow port to the turbine scroll flow passage 16 is led to the discharge port 14 through the connection passage 15 and the turbine impeller 9. The exhaust gas led to the discharge port 14 rotates the turbine impeller 9 in the course of flowing.

A rotational force of the turbine impeller 9 is transmitted to the compressor impeller 10 through the shaft 8. As described above, the air is increased in pressure by the rotational force of the compressor impeller 10, and is then led to the intake port of the engine.

Figure 2:
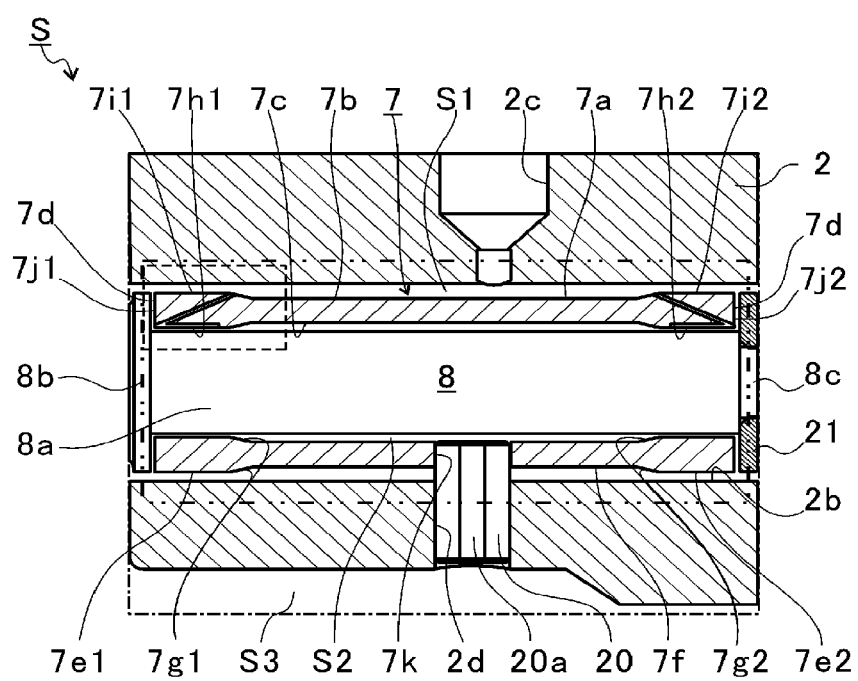
FIG. 2 is an extracted view for illustrating a portion indicated by one-dot chain lines of FIG. 1.

FIG. 2 is an extracted view for illustrating a portion indicated by one-dot chain lines of FIG. 1. FIG. 2 is a view for illustrating a configuration of a bearing structure S according to a first embodiment. As illustrated in FIG. 2, the bearing structure S is formed of the bearing housing 2, the semi-floating bearing 7, and the shaft 8. An oil passage 2c is formed in the bearing housing 2. Lubricating oil fed out from an oil pump (not shown) is introduced into the oil passage 2c. The oil passage 2c is opened to the bearing hole 2b. The lubricating oil flows from the oil passage 2c into the bearing hole 2b. The lubricating oil having flowed into the bearing hole 2b is supplied to the semi-floating bearing 7 provided in the bearing hole 2b.

The semi-floating bearing 7 includes an annular main body portion 7a. The main body portion 7a has an outer peripheral surface 7b, an inner peripheral surface 7c, and two end surfaces 7d. The two end surfaces 7d are end surfaces in an axial direction of the shaft 8 (hereinafter simply referred to as "axial direction"). The two end surfaces 7d are separated from each other in the axial direction. The shaft 8 is inserted through an inside (the inner peripheral surface 7c side) of the main body portion 7a.

The main body portion 7a includes two large-diameter portions 7e1 and 7e2 and a small-diameter portion 7f. The two large-diameter portions 7e1 and 7e2 are separated from each other in the axial direction. The large-diameter portion 7e1 is formed at an end portion of the main body portion 7a on the turbine impeller 9 side. The large-diameter portion 7e2 is formed at an end portion of the main body portion 7a on the compressor impeller 10 side. The two large-diameter portions 7e1 and 7e2 each have a first diameter as an outer diameter and have a second diameter as an inner diameter.

The small-diameter portion 7f is arranged between the two large-diameter portions 7e1 and 7e2. The small-diameter portion 7f connects the two large-diameter portions 7e1 and 7e2 to each other. The small-diameter portion 7f has a third diameter as an outer diameter smaller than the first diameter and has a fourth diameter as an inner diameter larger than the second diameter. An inclined portion 7g1 is formed between the large-diameter portion 7e1 and the small-diameter portion 7f. An inclined portion 7g2 is formed between the large-diameter portion 7e2 and the small-diameter portion 7f.

Two radial bearing surfaces 7h1 and 7h2 are formed on the inner peripheral surface 7c of the main body portion 7a. The two radial bearing surfaces 7h1 and 7h2 are separated from each other in the axial direction of the shaft 8. The radial bearing surface 7h1 is formed on the inner peripheral surface 7c of the large-diameter portion 7e1. The radial bearing surface 7h2 is formed on the inner peripheral surface 7c of the large-diameter portion 7e2. An opening through which the oil passage 2c communicates with the bearing hole 2b is located between the two radial bearing surfaces 7h1 and 7h2. In other words, the pair of radial bearing surface 7h1 and 7h2 are respectively located on one side and on another side in the axial direction of the shaft 8 with respect to the opening of the oil passage 2c. The two radial bearing surfaces 7h1 and 7h2 each have a cylindrical shape.

Two damper portions 7i1 and 7i2 are formed on the outer peripheral surface 7b of the main body portion 7a. The two damper portions 7i1 and 7i2 are separated from each other in the axial direction of the shaft 8. The damper portion 7i1 is formed on the outer peripheral surface 7b of the large-diameter portion 7e1. The damper portion 7i2 is formed on the outer peripheral surface 7b of the large-diameter portion 7e2. An opening through which the oil passage 2c communicates with the bearing hole 2b is located between the two damper portions 7i1 and 7i2. The two damper portions 7i1 and 7i2 each have a cylindrical shape.

The oil passage 2c is opened at a position (in a region) on the inner peripheral surface of the bearing hole 2b where the oil passage 2c is opposed to the outer peripheral surface 7b of the small-diameter portion 7f. The oil passage 2c communicates with a space S1 defined between the small-diameter portion 7f and the bearing hole 2b. The oil passage 2c is opened to the bearing hole 2b above the shaft 8 in a vertical direction.

Two thrust bearing surfaces 7j1 and 7j2 are respectively formed on the two end surfaces (both end surfaces) 7d of the main body portion 7a. The two thrust bearing surfaces 7j1 and 7j2 are separated from each other in the axial direction of the shaft 8. The thrust bearing surface 7j1 is formed on the end surface 7d of the large-diameter portion 7e1. The thrust bearing surface 7j2 is formed on the end surface 7d of the large-diameter portion 7e2. The two thrust bearing surfaces 7j1 and 7j2 each have a cylindrical shape.

A through hole 7k is formed in the main body portion 7a. The through hole 7k is formed in the small-diameter portion 7f. That is, the through hole 7k is formed between the pair of radial bearing surfaces 7h1 and 7h2. The through hole 7k is arranged on a side opposite to the oil passage 2c across the shaft 8. A position of the through hole 7k in the axial direction partially overlaps with that of the oil passage 2c. However, the through hole 7k may be formed at a position completely apart from the oil passage 2c in the axial direction. The through hole 7k passes through the small-diameter portion 7f from the inner peripheral surface 7c to the outer peripheral surface 7b. The through hole 7k passes through the small-diameter portion 7f in the radial direction. A pin hole (insertion hole) 2d is formed in the bearing housing 2. The pin hole 2d is arranged on a side opposite to the oil passage 2c across the bearing hole 2b. The pin hole 2d is formed at a position opposed to the through hole 7k in the radial direction of the shaft 8. The pin hole 2d passes through a wall portion having the bearing hole 2b.

A positioning pin 20 (insertion member) is inserted through the pin hole 2d of the bearing housing 2. The positioning pin 20 is inserted in a direction intersecting the axial direction of the shaft 8. One end side of the positioning pin 20 is inserted through the through hole 7k. Another end side of the positioning pin 20 is inserted through the pin hole 2d. At least a part of the positioning pin 20 is arranged in the pin hole 2d. The positioning pin 20 is press-fitted to the pin hole 2d from a lower side in FIG. 2. However, the configuration is not limited to this case. For example, the positioning pin 20 may be formed of a bolt to be screw-fastened to the pin hole 2d. A distal end of the positioning pin 20 is located in the through hole 7k or in a space S2 defined between the shaft 8 and the small-diameter portion 7f. A rotation of the semi-floating bearing 7 in a circumferential direction and a movement of the semi-floating bearing 7 in the axial direction are restricted by the positioning pin 20. A small gap may be formed between the positioning pin 20 and the through hole 7k. In this embodiment, the distal end of the positioning pin 20 is flush with the inner peripheral surface 7c of the main body portion 7a. However, the distal end of the positioning pin 20 may protrude toward a radially inner side with respect to the inner peripheral surface 7c. Moreover, the distal end of the positioning pin 20 may be located a radially outer side with respect to the inner peripheral surface 7c.

The positioning pin 20 has a through hole 20a passing from one end to another end. The through hole 20a extends in a longitudinal direction of the positioning pin 20. The longitudinal direction of the positioning pin 20 is a direction in which the positioning pin 20 is inserted into the pin hole 2d and the through hole 7k. One end of the through hole 20a communicates with (is opened to) the space S2 defined between the small-diameter portion 7f and the shaft 8. Another end of the through hole 20a communicates with (is opened to) a space S3 defined on an outer side of (outside) the wall portion having the bearing hole 2b.

In this embodiment, the main body portion 7a has the single through hole 7k passing from the inner peripheral surface 7c to the outer peripheral surface 7b of the small-diameter portion 7f. That is, only the through hole 7k is formed as a through hole passing from the inner peripheral surface 7c to the outer peripheral surface 7b of the small-diameter portion 7f in the main body portion 7a. That is, such an oil hole disclosed in Patent Literature 1 is not formed in the main body portion 7a.

The shaft 8 includes a small-diameter portion 8a, a large-diameter portion 8b, and a reduced-diameter portion 8c. The small-diameter portion 8a is inserted through the main body portion 7a. The large-diameter portion 8b is larger in diameter than the small-diameter portion 8a, and is formed integrally with the small-diameter portion 8a. The reduced-diameter portion 8c is smaller in diameter than the small-diameter portion 8a, and is formed integrally with the small-diameter portion 8a. The large-diameter portion 8b is located on a left side (the turbine impeller 9 side) of the small-diameter portion 8a of FIG. 2. The reduced-diameter portion 8c is located on a right side (the compressor impeller 10 side) of the small-diameter portion 8a of FIG. 2. The large-diameter portion 8b and the reduced-diameter portion 8c may be formed of members different from that of the small-diameter portion 8a. The large-diameter portion 8b and the reduced-diameter portion 8c may be configured so as to be mountable to and detachable from the small-diameter portion 8a.

The large-diameter portion 8b is opposed to the main body portion 7a in the axial direction. An outer diameter of the large-diameter portion 8b is larger than the inner diameter of the large-diameter portion 7e1 of the main body portion 7a. The outer diameter of the large-diameter portion 8b is approximately equal to the outer diameter of the large-diameter portion 7e1 of the main body portion 7a. The outer diameter of the large-diameter portion 8b may be smaller than the outer diameter of the large-diameter portion 7e1, or may be larger than the outer diameter of the large-diameter portion 7e1.

An oil thrower member 21 is provided at the reduced-diameter portion 8c. The oil thrower member 21 is opposed to the main body portion 7a in the axial direction. The oil thrower member 21 is an annular member. The oil thrower member 21 causes the lubricating oil flowing along the shaft 8 to the compressor impeller 10 side to scatter toward the radially outer side. That is, leakage of the lubricating oil to the compressor impeller 10 side is prevented by the oil thrower member 21.

An outer diameter of a surface of the oil thrower member 21 which is opposed to the main body portion 7a is larger than an inner diameter of the large-diameter portion 7e2. The outer diameter of the surface of the oil thrower member 21 which is opposed to the main body portion 7a is approximately equal to an outer diameter of the large-diameter portion 7e2. The outer diameter of the surface of the oil thrower member 21 which is opposed to the main body portion 7a may be smaller than the outer diameter of the large-diameter portion 7e2, or may be larger than the outer diameter of the large-diameter portion 7e2.

Figure 3:
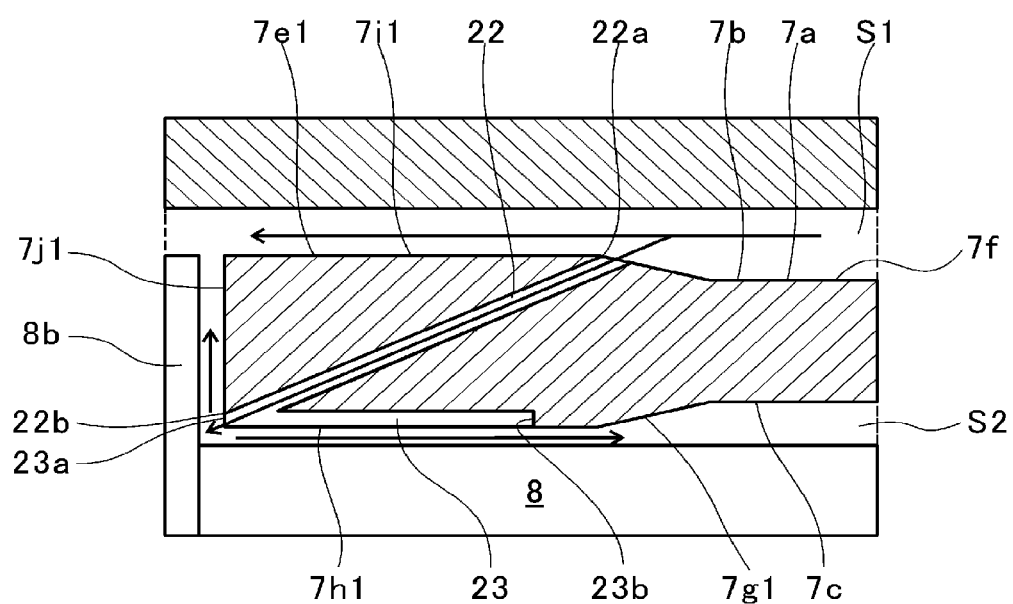
FIG. 3 is an extracted view for illustrating a portion indicated by broken lines of FIG. 2.

FIG. 3 is an extracted view for illustrating a portion indicated by broken lines of FIG. 2. In FIG. 3, flows of the lubricating oil are indicated by arrows. Moreover, a structure on the thrust bearing surface 7j1 side and a structure on the thrust bearing surface 7j2 side are substantially the same. In order to avoid a redundant description, a detailed description is given of the structure on the thrust bearing surface 7j1 side.

A communication hole 22 is formed in the main body portion 7a. A plurality of (for example, three) communication holes 22 are formed so as to be separated from each other in the circumferential direction of the main body portion 7a. The plurality of communication holes 22 are arranged at equal intervals in the circumferential direction of the main body portion 7a. However, the number of the communication holes 22 may be two, or may be four or more. Moreover, it is not always required that a plurality of communication holes 22 be formed, and one communication hole 22 may be formed. The communication hole 22 passes through a part of the main body portion 7a. The communication hole 22 extends in a direction inclined with respect to the axial direction.

An inlet end 22a of the communication hole 22 is opened in the outer peripheral surface 7b of the main body portion 7a. The inlet end 22a of the communication hole 22 is opened in the inclined portion 7g1 connecting the damper portion 7i1 and the small-diameter portion 7f of the outer peripheral surface 7b. The inlet end 22a of the communication hole 22 may be opened in the outer peripheral surface 7b of the small-diameter portion 7f. That is, the inlet end 22a of the communication hole 22 may be opened between the two damper portions 7i1 and 7i2. Moreover, the inlet end 22a of the communication hole 22 may be opened in the damper portion 7i1. In this embodiment, the inclined portions 7g1 and 7g2 each have such a tapered shape that an outer diameter of each of the inclined portions 7g1 and 7g2 gradually increases from the small-diameter portion 7f toward each of the large-diameter portions 7e1 and 7e2. However, the configuration is not limited to this case, and the inclined portions 7g1 and 7g2 may be in a step shape having a surface perpendicular to the axial direction. An outlet end 22b of the communication hole 22 is opened between the thrust bearing surface 7j1 and the radial bearing surface 7h1. That is, the outlet end 22b of the communication hole 22 is opened across the thrust bearing surface 7j1 and the radial bearing surface 7h1.

An oil groove 23 is formed in the main body portion 7a. A plurality of (for example, three) oil grooves 23 are formed so as to be separated from each other in the circumferential direction of the main body portion 7a. The plurality of oil grooves 23 are arranged at equal intervals in the circumferential direction of the main body portion 7a. However, the number of the oil grooves 23 may be two, or may be four or more. Moreover, it is not always required that a plurality of oil grooves 23 be formed, and one oil groove 23 may be formed. In this embodiment, the same number of oil grooves 23 as that of the communication holes 22 are formed. Moreover, the oil grooves 23 are arranged at the same positions as those of the communication holes 22 in the circumferential direction of the main body portion 7a. The oil grooves 23 are formed in the radial bearing surface 7h1. The oil grooves 23 extend in a direction parallel to the axial direction.

A base end 23a of the oil groove 23 is opened in the thrust bearing surface 7j1 of the main body portion 7a. The base end 23a of the oil groove 23 is opened at the innermost position of the thrust bearing surface 7j1 in the radial direction. The base end 23a of the oil groove 23 is connected to the outlet end 22b of the communication hole 22. That is, the communication hole 22 is continuous with the oil groove 23. In other words, the communication hole 22 is opened in the oil groove 23. In this embodiment, the communication holes 22 are arranged at the same positions as those of the oil grooves 23 in the circumferential direction of the main body portion 7a. However, the configuration is not limited to this case, and the communication holes 22 may be arranged at positions different from those of the oil grooves 23 in the circumferential direction of the main body portion 7a. For example, the communication holes 22 may obliquely extend so that positions in the circumferential direction change along the axial direction. Also in this case, the outlet end 22b of the communication hole 22 may be continuous with the oil groove 23. A terminal end 23b of the oil groove 23 is formed at a position separated by a predetermined distance from the inclined portion 7g1 toward the turbine impeller 9 side in the axial direction. The terminal end 23b of the oil groove 23 is formed between an end of the radial bearing surface 7h1 on the turbine impeller 9 side and an end of the radial bearing surface 7h1 on the compressor impeller 10 side in the axial direction.

In this embodiment, the oil groove 23 does not pass through the large-diameter portion 7e1 in the axial direction. However, the oil groove 23 may pass through the large-diameter portion 7e1 in the axial direction. For example, the length of the oil groove 23 may be increased while a width in the circumferential direction of the shaft 8 and a height in the radial direction of the shaft 8 may be reduced compared with those in the case in which the oil groove 23 does not pass through the large-diameter portion 7e1 in the axial direction. The length of the oil groove 23 in the axial direction is only required to be changed (adjusted) in accordance with the width and the height. Thus, the length of the oil groove 23 in the axial direction may be increased by reducing the width and the height of the oil groove 23 so as to allow the oil groove 23 to pass through the large-diameter portion 7e1 in the axial direction.

The outlet end 22b of the communication hole 22 may be opened only in the thrust bearing surface 7j1. In this case, it is preferred that the thrust bearing surface 7j1 additionally have a groove configured to connect the outlet end 22b of the communication hole 22 and the base end 23a of the oil groove 23 to each other. Moreover, the outlet end 22b of the communication hole 22 may be opened only in the radial bearing surface 7h1. In this case, the outlet end 22b of the communication hole 22 and the thrust bearing surface 7j1 are connected to each other through the oil groove 23.

Figure 4:
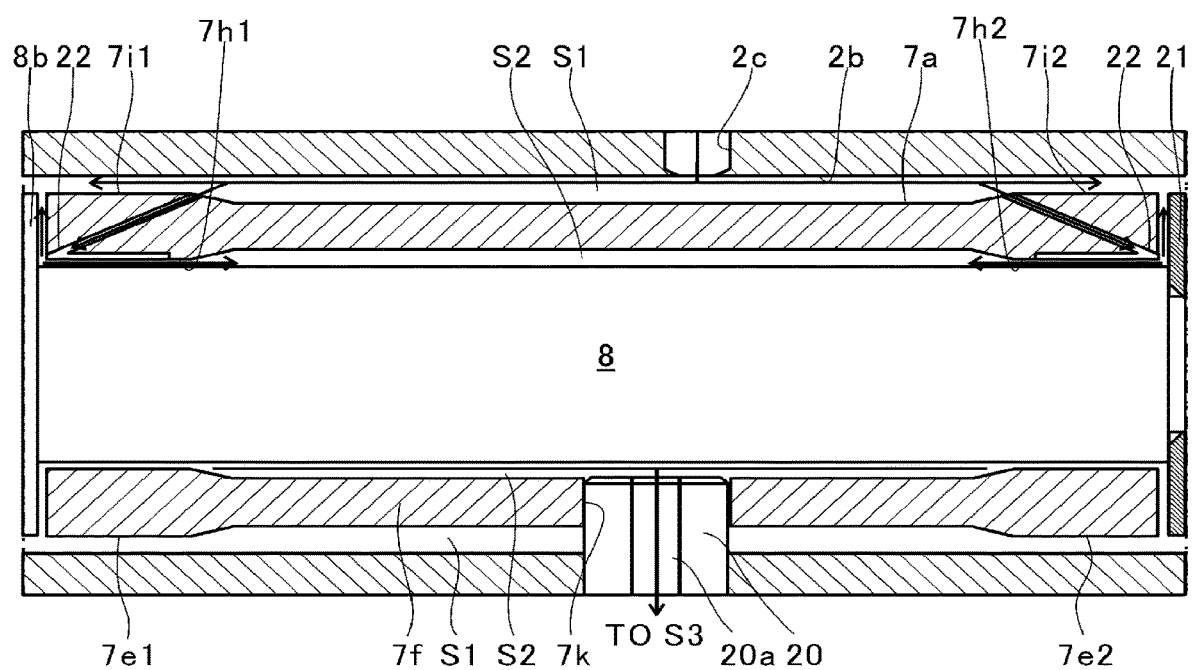
FIG. 4 is an extracted view for illustrating a portion indicated by two-dot chain lines of FIG. 2.

FIG. 4 is an extracted view for illustrating a portion indicated by two-dot chain lines of FIG. 2. In FIG. 4, flows of the lubricating oil are indicated by arrows. The lubricating oil is supplied from the oil passage 2c to the bearing hole 2b. The lubricating oil is supplied to the space S1 defined between the inner peripheral surface of the bearing hole 2b and the outer peripheral surface of the main body portion 7a. As described before, only one through hole 7k is formed in the small-diameter portion 7f of the main body portion 7a. The positioning pin 20 is inserted into the through hole 7k. The through hole 7k is closed by the positioning pin 20. Therefore, the lubricating oil is less likely to enter the space S2 from the space S1 through the through hole 7k.

The lubricating oil having been supplied to the space S1 moves toward right-and-left directions (the large-diameter portion 7e1 side and the large-diameter portion 7e2 side) illustrated in FIG. 4. The lubricating oil having moved toward the large-diameter portion 7e1 side flows into a gap between the damper portion 7i1 and the bearing hole 2b. The lubricating oil having moved toward the large-diameter portion 7e2 side flows into a gap between the damper portion 7i2 and the bearing hole 2b. The lubricating oil flows in the damper portion 7i1 from the compressor impeller 10 side toward the turbine impeller 9 side. The lubricating oil flows in the damper portion 7i2 from the turbine impeller 9 side toward the compressor impeller 10 side.

Vibration of the shaft 8 is absorbed (suppressed) by an oil film pressure of the lubricating oil supplied to the dumper portions 7i1 and 7i2. The lubricating oil having passed the damper portion 7i1 passes the gap between the large-diameter portion 8b and the bearing hole 2b, and is discharged to an outside of the bearing hole 2b. The lubricating oil having passed the damper portion 7i2 passes the gap between the oil thrower member 21 and the bearing hole 2b, and is discharged to the outside of the bearing hole 2b.

Moreover, a part of the lubricating oil having been supplied to the space S1 flows into the communication holes 22. Referring again to FIG. 3, a description is now given of a flow of the lubricating oil flowing into the communication holes 22.

As illustrated in FIG. 3, the part of the lubricating oil having been supplied to the space S1 flows from the inlet end 22a of the communication hole 22 into an inside of the communication hole 22. The lubricating oil passes the inside of the communication hole 22, and is discharged from the outlet end 22b. The lubricating oil discharged from the outlet end 22b flows so as to branch off to the axial direction of the shaft 8 and to a direction perpendicular to the axial direction of the shaft 8.

The lubricating oil flowing in the axial direction lubricates the radial bearing surface 7h1. The lubricating oil flowing in the direction perpendicular to the axial direction lubricates the thrust bearing surface 7j1. As described above, the lubrication of the thrust bearing surface 7j1 and the lubrication of the radial bearing 7h1 are performed separately in this embodiment. The structure on the thrust bearing surface 7j1 side and the structure on the thrust bearing surface 7j2 side of the main body portion 7a are substantially the same. Therefore, lubrication of the thrust bearing surface 7j2 and lubrication of the radial bearing surface 7h2 are also performed separately.

The lubricating oil flowing in the direction perpendicular to the axial direction flows in the gap between the large-diameter portion 8b and the thrust bearing surface 7j1. The lubricating oil flows from a radially inner side toward a radially outer side of the thrust bearing surface 7j1. The lubricating oil having passed the thrust bearing surface 7j1 passes the gap between the large-diameter portion 8b and the bearing hole 2b, and is discharged to the outside of the bearing hole 2b. Similarly, the lubricating oil having passed the thrust bearing surface 7j2 passes the gap between the oil thrower member 21 and the bearing hole 2b, and is discharged to the outside of the bearing hole 2b.

The main body portion 7a is sandwiched by the oil thrower member 21 and the large-diameter portion 8b in the axial direction. The lubricating oil is supplied to the gap between the main body portion 7a and the large-diameter portion 8b. The lubricating oil is supplied to the gap between the main body portion 7a and the oil thrower member 21. The movement of the main body portion 7a in the axial direction is restricted by the positioning pin 20. When the shaft 8 moves in the axial direction, the oil thrower member 21 or the large-diameter portion 8b is supported by the oil film pressure between the oil thrower member 21 and the main body portion 7a or between the large-diameter portion 8b and the main body portion 7a. As a result, the movement of the shaft 8 in the axial direction is restricted. That is, both end surfaces of the main body portion 7a function as the thrust bearing surfaces 7j1 and 7j2. The thrust bearing surfaces 7j1 and 7j2 receive a thrust load.

The lubricating oil flowing in the axial direction flows in the gap between the outer peripheral surface of the shaft 8 and the radial bearing surface 7h1. The lubricating oil flows on the radial bearing surface 7h1 from the turbine impeller 9 side toward the compressor impeller 10 side. Similarly, the lubricating oil led into the gap between the outer peripheral surface of the shaft 8 and the radial bearing surface 7h2 flows on the radial bearing surface 7h2 from the compressor impeller 10 side toward the turbine impeller 9 side. The shaft 8 is axially supported by the oil film pressure of the lubricating oil supplied between the outer peripheral surface of the shaft 8 and the radial bearing surfaces 7h1 and 7h2 so as to be rotatable. The lubricating oil having passed the radial bearing surface 7h1 is discharged into the space S2. Similarly, the lubricating oil having passed the radial bearing surface 7h2 is discharged into the space S2.

Returning to FIG. 4, the lubricating oil having been discharged from the radial bearing surfaces 7h1 and 7h2 into the space S2 moves toward a lower side in the vertical direction (lower side of FIG. 4) along the circumferential direction of the shaft 8 in the space S2. In FIG. 4, the lubricating oil having moved to the lower side flows from the space S2 into the through hole 20a formed in the positioning pin 20. The lubricating oil having flowed into the through hole 20a is discharged from the space S2 into the space S3.

The semi-floating bearing 7 in this embodiment does not have an oil hole configured to introduce the lubricating oil from the outer peripheral surface 7b side to the inner peripheral surface 7c side of the small-diameter portion 7f. In the configuration of this embodiment, the through hole 7k is formed in the small-diameter portion 7f. However, the positioning pin 20 is inserted into the through hole 7k. As a result, the lubricating oil is less likely to enter the inner peripheral surface 7c (space S2) side from the outer peripheral surface 7b (space S1) side through the through hole 7k.

Moreover, the through hole 20a is formed in the positioning pin 20. The lubricating oil having been supplied to (accumulated in) the space S2 is discharged to the outside of the bearing hole 2b by the through hole 20a. Therefore, the lubricating oil is less likely to flow toward directions in which the pair of the thrust bearing surfaces 7j1 and 7j1 separate from the space S2 (hereinafter simply referred to as "separation directions"). In other words, the lubricating oil is less likely to flow on the radial bearing surfaces 7h1 and 7h2 toward the separation directions.

When the lubricating oil flows on the radial bearing surfaces 7h1 and 7h2 toward the separation directions, the temperature of the lubricating oil supplied to the thrust bearing surfaces 7j1 and 7j2 increases. As a result, load capacities of the thrust bearing surfaces 7j1 and 7j2 decrease. Moreover, in order to supply the lubricating oil by an oil amount required for the thrust bearing surfaces 7j1 and 7j2, a required oil amount of the lubricating oil to be supplied to the radial bearing surfaces 7h1 and 7h2 is larger than an oil amount of the lubricating oil optimal for the radial bearing surfaces 7h1 and 7h2. Therefore, an oil film temperature of the radial bearing surfaces 7h1 and 7h2 decreases. As a result, mechanical losses of the radial bearing surfaces 7h1 and 7h2 increase. An optimal oil amount and an optimal oil temperature for the thrust bearing surfaces 7j1 and 7j2 are different from an optimal oil amount and an oil temperature for the radial bearing surfaces 7h1 and 7h2. Therefore, when the lubricating oil is supplied to the thrust bearing surfaces 7j1 and 7j2 via the radial bearing surfaces 7h1 and 7h2, it is difficult to optimize the oil amounts and the oil temperatures of the lubricating oil supplied to the respective bearing surfaces. As a result, it is difficult to improve the bearing performance. The same applies to a case in which the lubricating oil is supplied to the radial bearing surfaces 7h1 and 7h2 via the thrust bearing surfaces 7j1 and 7j2.

Meanwhile, in this embodiment, the lubricating oil flows so as to branch off from the outlet end 22b of the communication hole 22 to the axial direction of the shaft 8 and the direction perpendicular to the axial direction of the shaft 8. In other words, the lubricating oil flows so as to branch off from the outlet end 22b of the communication hole 22 to the thrust bearing surfaces 7j1 and 7j2 and the radial bearing surfaces 7h1 and 7h2. That is, the communication hole 22 supplies the lubricating oil to the thrust bearing surfaces 7j1 and 7j2 and the radial bearing surfaces 7h1 and 7h2 separately. Therefore, the semi-floating bearing 7 can reduce the temperature of the lubricating oil supplied to the thrust bearing surfaces 7j1 and 7j2 compared with that in a case in which the lubricating oil is supplied after the lubrication of the radial bearing surfaces 7h1 and 7h2. As a result, the semi-floating bearing 7 can increase the load capacities of the thrust bearing surfaces 7j1 and 7j2.

Moreover, the lubricating oil is supplied separately, and hence the oil amount, the oil temperature, a mechanical loss, and the like optimal for the thrust bearing surfaces 7j1 and 7j2 and those optimal for the radial bearing surfaces 7h1 and 7h2 can be designed independently of each other. For example, the oil amount, the oil temperature, the mechanical loss, and the like optimal for the radial bearing surfaces 7h1 and 7h2 can be adjusted by adjusting the width, the height, or the length of the oil groove 23 illustrated in FIG. 3. Moreover, the oil amount, the oil temperature, the mechanical loss, and the like optimal for the thrust bearing surfaces 7j1 and 7j2 may be adjusted by forming oil grooves extending in the radial direction in the thrust bearing surfaces 7j1 and 7j2, and adjusting a width, a height, or a length of the formed oil grooves.

As described above, in this embodiment, the communication holes 22 supply the lubricating oil separately to the thrust bearing surfaces 7j1 and 7j2 and the radial bearing surfaces 7h1 and 7h2. Therefore, the thrust bearing surfaces 7j1 and 7j2 and the radial bearing surfaces 7h1 and 7h2 of the semi-floating bearing 7 can be designed independently and easily. Consequently, the optimization of the oil amount and the oil temperature of the lubricating oil flowing on the thrust bearing surfaces 7j1 and 7j2 and that of the radial bearing surfaces 7h1 and 7h2, and the mechanical loss of the thrust bearing surfaces 7j1 and 7j2 and that of the radial bearing surfaces 7h1 and 7h2 are easily achieved. As a result, the bearing performance of the semi-floating bearing 7 can be improved.

Figure 5A:
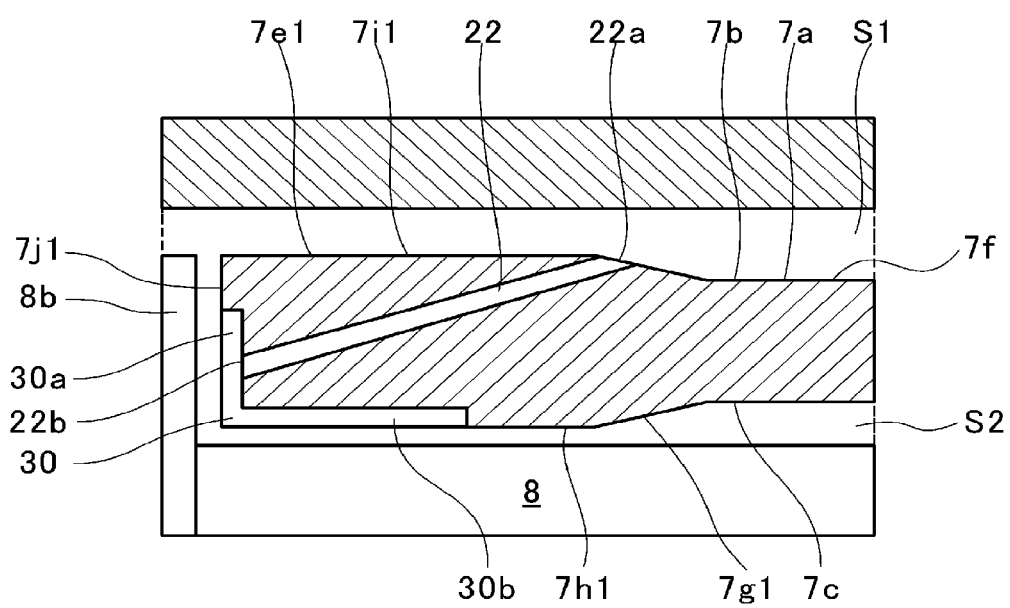
FIG. 5A is an extracted view for illustrating a portion corresponding to FIG. 3 in a second embodiment.
Figure 5B:
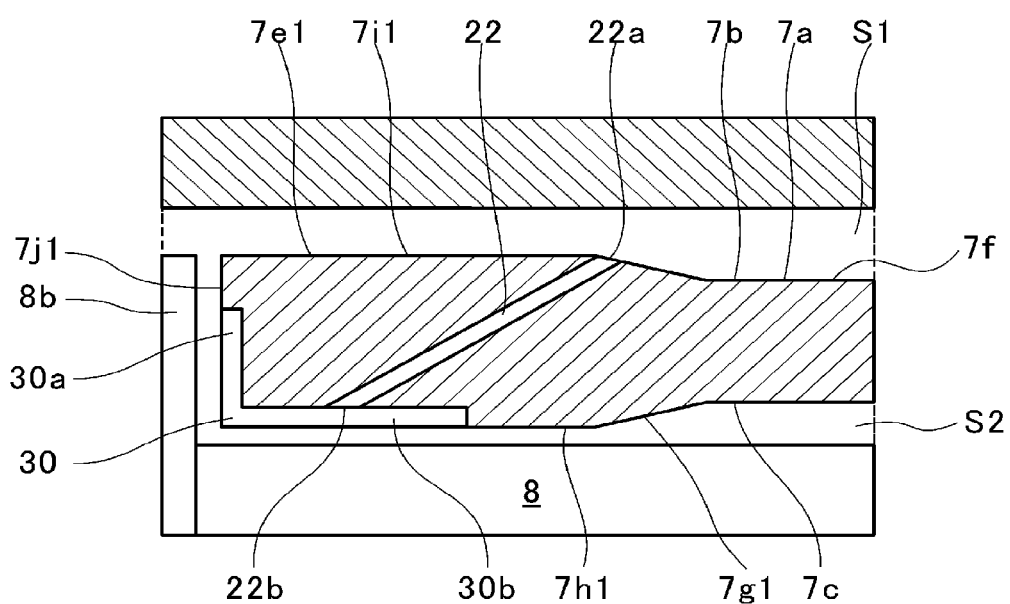
FIG. 5B is an extracted view for illustrating the portion corresponding to FIG. 3 in a modification example of the second embodiment.

FIG. 5A is an extracted view for illustrating a portion corresponding to FIG. 3 in a second embodiment. FIG. 5B is an extracted view for illustrating the portion corresponding to FIG. 3 in a modification example of the second embodiment. In the second embodiment, the structure on the thrust bearing surface 7j1 side and the structure on the thrust bearing surface 7j2 side are substantially the same. In order to avoid a redundant description, a detailed description is given of the structure on the thrust bearing surface 7j1 side.

The second embodiment is different from the above-mentioned embodiment in that an oil groove 30 being continuous with the thrust bearing surface 7j1 and the radial bearing surface 7h1 is formed. Moreover, the second embodiment is different from the above-mentioned embodiment in that the outlet end 22b of the communication hole 22 is opened in the oil groove 30.

As illustrated in FIG. 5A and FIG. 5B, oil grooves 30 are formed in the main body portion 7a. A sectional shape of the oil groove 30 including a center axis of the shaft 8 is an approximately L shape. A plurality (for example, three) of oil grooves 30 are formed so as to be separated from each other in the circumferential direction of the main body portion 7a. The plurality of oil grooves 30 are arranged at equal intervals in the circumferential direction of the main body portion 7a. However, the number of the oil grooves 30 may be two, or may be four or more. Moreover, it is not always required that a plurality of oil grooves 30 be formed, and one oil groove 30 may be formed. In the second embodiment, the same number of oil grooves 30 as that of the communication holes 22 are formed. Moreover, the oil grooves 30 are arranged at the same positions as those of the communication holes 22 in the circumferential direction of the main body portion 7a. The oil groove 30 is formed continuously across the thrust bearing surface 7j1 and the radial bearing surface 7h1. The oil groove 30 includes a first oil groove 30a and a second oil groove 30b.

The first oil groove 30a is formed in the thrust bearing surface 7j1. The first oil groove 30a extends in the radial direction of the main body portion 7a. The second oil groove 30b is formed in the radial bearing surface 7h1. The second oil groove 30b extends in the axial direction of the shaft 8. The first oil groove 30a and the second oil groove 30b are continuous with each other between the thrust bearing surface 7j1 and the radial bearing surface 7h1.

An end of the first oil groove 30a is formed at a position separated by a predetermined distance from the outer peripheral surface 7b of the main body portion 7a toward the inner side in the radial direction. That is, the end of the first oil groove 30a is formed between an end of the thrust bearing surface 7j1 on the radially outer side and an end of the thrust bearing surface 7j1 on the radially inner side in the radial direction. The first oil groove 30a does not pass through the large-diameter portion 7e1 in the radial direction. However, a width or a height of the first oil groove 30a may be adjusted so that the first oil groove 30a may pass through the large-diameter portion 7e1 in the radial direction.

An end of the second oil groove 30b is formed at a position separated by a predetermined distance from the inclined portion 7g1 toward the turbine impeller 9 side in the axial direction. That is, the end of the second oil groove 30b is formed between an end of the radial bearing surface 7h1 on the turbine impeller 9 side and an end of the radial bearing surface 7h1 on the compressor impeller 10 side in the axial direction. The second oil groove 30b does not pass through the large-diameter portion 7e1 in the axial direction. However, a width or a height of the second oil groove 30b may be adjusted so that the second oil groove 30b may pass through the large-diameter portion 7e1 in the axial direction.

As illustrated in FIG. 5A, the outlet end 22b of the communication hole 22 is opened in the oil groove 30. Specifically, the outlet end 22b of the communication hole 22 is opened in the first oil groove 30a. However, as illustrated in FIG. 5B, the outlet end 22b of the communication hole 22 may be opened in the second oil groove 30b. Moreover, the outlet end 22b of the communication hole 22 may be opened in a connection portion (not shown) at which the first oil groove 30a and the second oil groove 30b are connected to each other. In this case, the outlet end 22b of the communication hole 22 may be opened across the first oil groove 30a and the second oil groove 30b.

In the second embodiment, the outlet end 22b of the communication hole 22 is connected to the oil groove 30. As a result, the communication hole 22 can supply the lubricating oil to an inside of the oil groove 30 independently of the connection position between the outlet end 22b and the oil groove 30. For example, as illustrated in FIG. 5A, even when the outlet end 22b of the communication hole 22 is connected to the first oil groove 30a, the communication hole 22 can supply the lubricating oil to the second oil groove 30b. As a result, the semi-floating bearing 7 can lubricate the thrust bearing surfaces 7j1 and 7j2 and the radial bearing surfaces 7h1 and 7h2 separately. Moreover, the oil amount, the oil temperature, and the like of the lubricating oil can be adjusted by changing the connection position of the outlet end 22b of the communication hole 22 to the oil groove 30. As a result, the bearing performance of the semi-floating bearing 7 can easily be improved. In the second embodiment, the inlet end 22a of the communication hole 22 is opened in the outer peripheral surface 7b of the main body portion 7a. The inlet end 22a may be opened in any one of the damper portions 7i1 and 7i2, the inclined portions 7g1 and 7g2, and the small-diameter portion 7f.

Figure 6A:
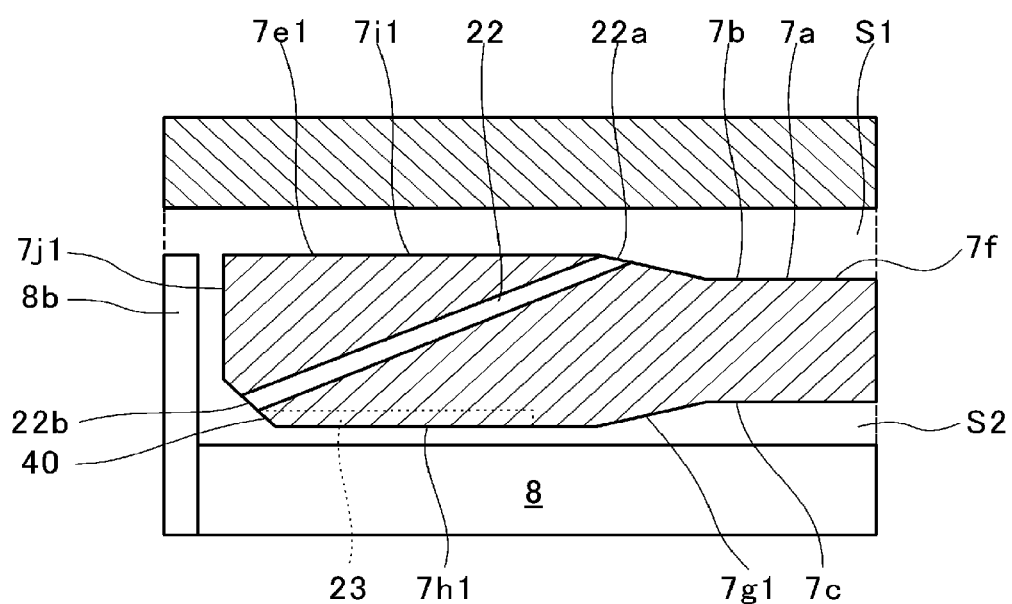
FIG. 6A is an extracted view for illustrating the portion corresponding to FIG. 3 in a third embodiment.
Figure 6B:
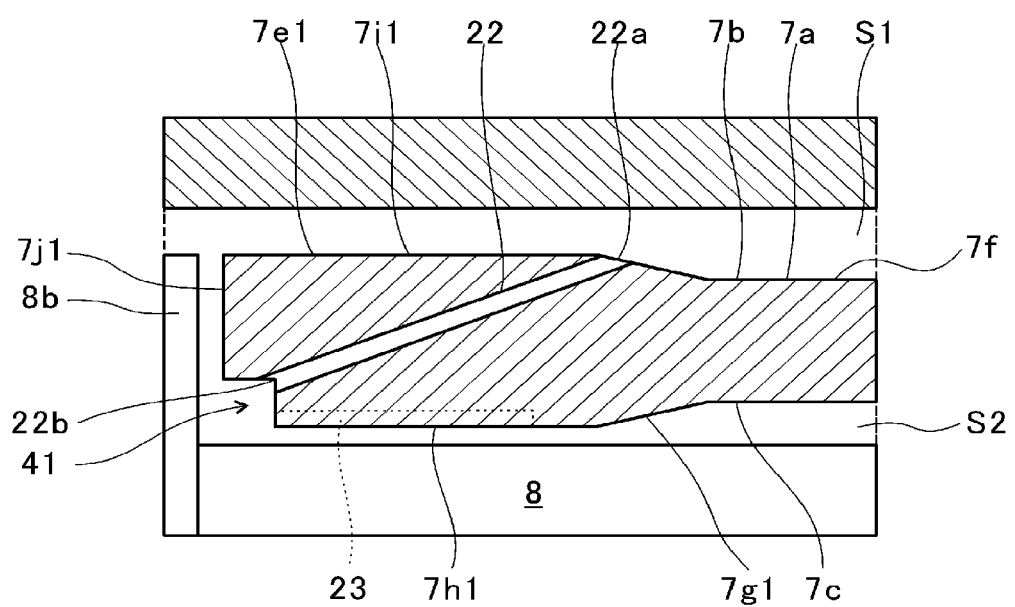
FIG. 6B is an extracted view for illustrating the portion corresponding to FIG. 3 in a modification example of the third embodiment.

FIG. 6A is an extracted view for illustrating a portion corresponding to FIG. 3 in a third embodiment. FIG. 6B is an extracted view for illustrating the portion corresponding to FIG. 3 in a modification example of the third embodiment. In the third embodiment, the structure on the thrust bearing surface 7j1 side and the structure on the thrust bearing surface 7j2 side are substantially the same. In order to avoid a redundant description, a detailed description is given of the structure on the thrust bearing surface 7j1 side.

The third embodiment is different from the above-mentioned embodiments in that the thrust bearing surface 7j1 and the radial bearing surface 7h1 are connected through a chamfered portion (or a groove) chamfered over an entire circumference.

As illustrated in FIG. 6A, a chamfered portion (groove) 40 is formed in the main body portion 7a. The chamfered portion 40 is formed between the thrust bearing surface 7j1 and the radial bearing surface 7h1. The chamfered portion 40 extends in the circumferential direction of the main body portion 7a. In the third embodiment, the chamfered portion 40 extends over the entire circumference of the main body portion 7a. However, the configuration is not limited to this case, and the chamfered portion 40 may not extend over the entire circumference of the main body portion 7a. For example, the chamfered portion 40 may extend over a part of the main body portion 7a in the circumferential direction. Specifically, the chamfered portion 40 is formed only in regions in which the plurality of communication holes 22 are formed in the circumferential direction of the main body portion 7a. As a result, even when the chamfered portion 40 does not extend over the entire circumference of the main body portion 7a, the chamfered portion 40 can communicate with all of the outlet ends 22b of the plurality of communication holes 22 formed in the circumferential direction of the main body portion 7a. However, when the chamfered portion 40 extends over the entire circumference of the main body portion 7a, machinability and productivity increase, and it is preferred that the chamfered portion 40 be formed over the entire circumference of the main body portion 7a. The chamfered portion 40 inclines in a direction toward the outer side in the radial direction as approaching from the radial bearing surface 7h1 toward the thrust bearing surface 7j1. A width in a direction orthogonal to the circumferential direction out of the chamfered surface (inclined surface) of the chamfered portion 40 is larger than the diameter of the communication hole 22. A sectional shape of the chamfered portion 40 including the center axis of the shaft 8 may be straight or curved. The outlet end 22b of the communication hole 22 is opened in the chamfered portion 40 (chamfered surface).

As illustrated in FIG. 6B, in the modification example of the third embodiment, a groove 41 is formed in the main body portion 7a. The groove 41 is formed between the thrust bearing surface 7j1 and the radial bearing surface 7h1. The groove 41 extends in the circumferential direction of the main body portion 7a. In the modification example of the third embodiment, the groove 41 extends over the entire circumference of the main body portion 7a. However, the configuration is not limited to this, and the groove 41 may not extend over the entire circumference of the main body portion 7a. For example, the chamfered portion 40 may extend over a part of the main body portion 7a in the circumferential direction. Specifically, the groove 41 is formed only in regions in which the plurality of communication holes 22 are formed in the circumferential direction of the main body portion 7a. As a result, even when the groove 41 does not extend over the entire circumference of the main body portion 7a, the groove 41 can communicate with all of the outlet ends 22b of the plurality of communication holes 22 formed in the circumferential direction of the main body portion 7a. However, when the groove 41 extends over the entire circumference of the main body portion 7a, machinability and productivity improve, and it is preferred that the groove 41 be formed over the entire circumference of the main body portion 7a. A sectional shape of the groove 41 containing the center axis of the shaft 8 is an approximately rectangular shape. A width of the groove 41 in the axial direction is larger than the diameter of the communication hole 22. A width of the groove 41 in the radial direction is larger than the diameter of the communication hole 22. However, the sectional shape of the groove 41 including the center axis of the shaft 8 may be a polygonal shape or an arc shape. The outlet end 22b of the communication hole 22 is opened in the groove 41.

The main body portion 7a includes oil grooves 23 indicated by broken lines of FIG. 6A and FIG. 6B. In the third embodiment, the communication holes 22 are arranged at positions different from those of the oil grooves 23 in the circumferential direction of the main body portion 7a. The oil groove 23 communicates with the chamfered portion 40 or the groove 41. The lubricating oil discharged from the communication hole 22 flows along the circumferential direction of the main body portion 7a through the chamfered portion 40 or the groove 41. The lubricating oil having flowed along the circumferential direction is introduced into the oil groove 23. That is, the lubricating oil having been discharged from the communication hole 22 flows into the oil groove 23 through the chamfered portion 40 or the groove 41. In such a manner, the oil grooves 23 may be arranged at the positions different from the positions of the communication holes 22 in the circumferential direction. However, also in the third embodiment, as illustrated in FIG. 3, the oil grooves 23 may be arranged at the same positions as those of the communication holes 22 in the circumferential direction of the main body portion 7a.

The lubricating oil discharged from the outlet end 22b of the communication hole 22 is supplied to the chamfered portion 40 or the groove 41. The chamfered portion 40 or the groove 41 extends over the entire circumference of the main body portion 7a. The lubricating oil supplied to the chamfered portion 40 or the groove 41 flows so as to branch off respectively to the thrust bearing surface 7j1 and the radial bearing surface 7h1. As a result, the semi-floating bearing 7 can lubricate an entire surface of the thrust bearing surface 7j1 and an entire surface of the radial bearing surface 7h1 separately.

Widths of the chamfered portion 40 and the groove 41 are larger than the diameter of the communication hole 22. Therefore, even when a center axis of the communication hole 22 is slightly apart from the connection portion between the thrust bearing surface 7j1 and the radial bearing surface 7h1, the communication hole 22 can supply the lubricating oil to the chamfered portion 40 or the groove 41.

In the third embodiment, the chamfered portions 40 or the grooves 41 are formed in the main body portion 7a. As a result, variation in the opening positions of the outlet ends 22b of the communication holes 22 is allowed to a certain degree. Even when an accuracy of the opening position of the outlet end 22b of the communication hole 22 is not high, the communication hole 22 can communicate with the chamfered portion 40 or the groove 41. Therefore, production of the semi-floating bearing 7 becomes easier.

Figure 7A:
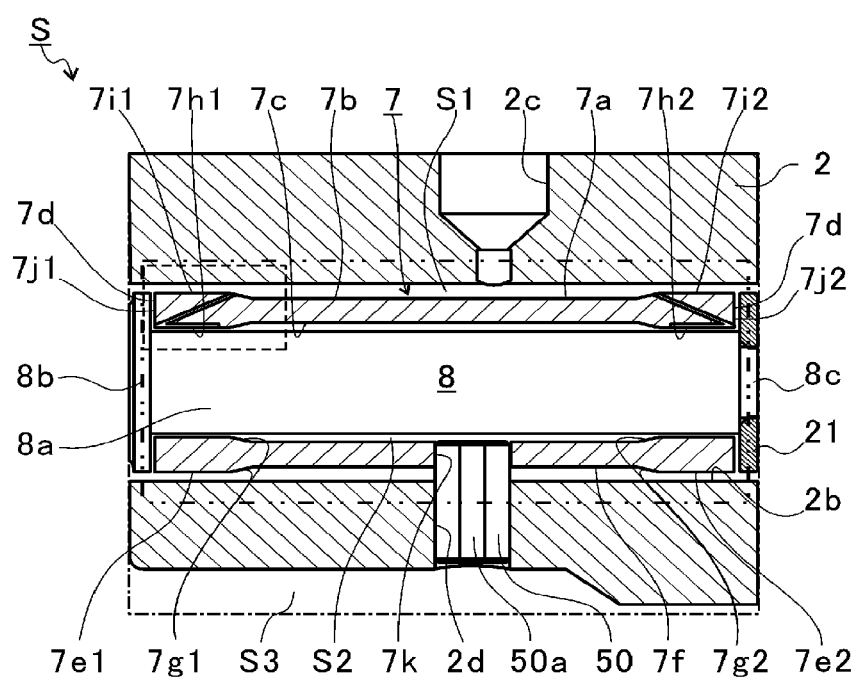
FIG. 7A is an extracted view for illustrating a portion corresponding to FIG. 2 in a fourth embodiment.
Figure 7B:
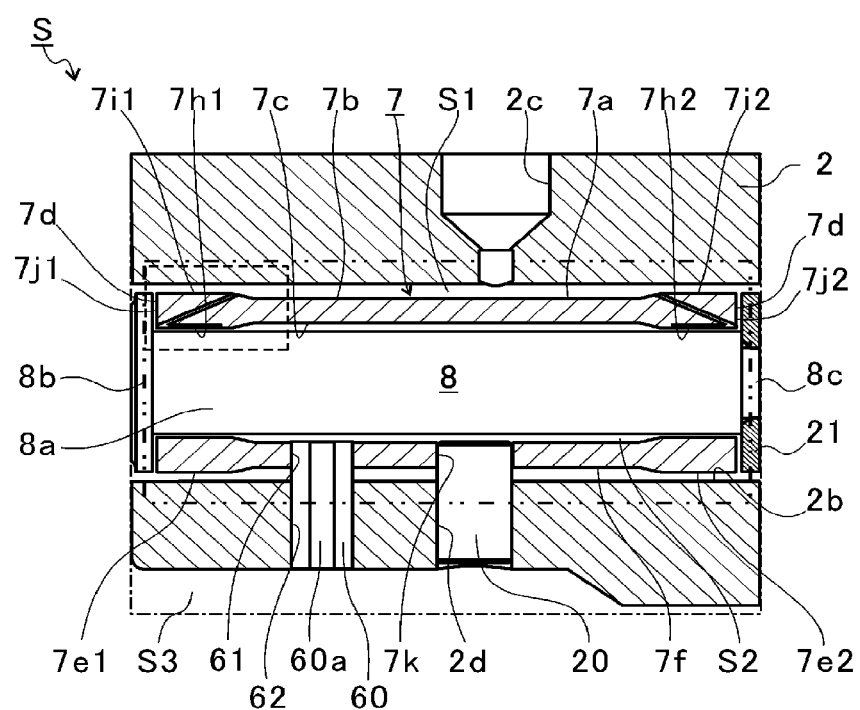
FIG. 7B is an extracted view for illustrating the portion corresponding to FIG. 2 in a modification example of the fourth embodiment.

FIG. 7A is an extracted view for illustrating a portion corresponding to FIG. 2 in a fourth embodiment. FIG. 7B is an extracted view for illustrating the portion corresponding to FIG. 2 in a modification example of the fourth embodiment. The fourth embodiment is different from the above-mentioned embodiments in that the positioning pin 50 or a hollow member 60 is formed of an elastic body.

A positioning pin 50 (insertion member) is inserted through the pin hole 2d of the bearing housing 2. The positioning pin 50 is inserted in a direction intersecting the axial direction of the shaft 8. One end side of the positioning pin 50 is inserted through the through hole 7k. Another end side of the positioning pin 50 is inserted through the pin hole 2d. At least a part of the positioning pin 50 is arranged in the pin hole 2d. A distal end of the positioning pin 50 is located in the through hole 7k or in a space S2 defined between the shaft 8 and the small-diameter portion 7f. A rotation of the semi-floating bearing 7 in a circumferential direction and a movement of the semi-floating bearing 7 in the axial direction are restricted by the positioning pin 50.

The positioning pin 50 includes a through hole 50a passing from one end to another end. The through hole 50a extends in a longitudinal direction of the positioning pin 50. The longitudinal direction of the positioning pin 50 is a direction in which the positioning pin 50 is inserted into the pin hole 2d and the through hole 7k. One end of the through hole 50a communicates with (is opened to) the space S2 defined between the small-diameter portion 7f and the shaft 8. The another end of the through hole 50a communicates with (is opened to) the space S3, which is located on an outer side of (outside) the wall portion having the bearing hole 2b. The positioning pin 50 is press-fitted to the pin hole 2d from a lower side in FIG. 7A. The positioning pin 50 is press-fitted to the through hole 7k from a lower side of FIG. 7A. The positioning pin 50 is formed of the elastic body. The positioning pin 50 is formed of a member such as rubber that is elastically deformable at the time of the press fitting.

The positioning pin 50 is press-fitted to the through hole 7k, and a gap between the through hole 7k and the positioning pin 50 thus decreases. Therefore, in the fourth embodiment, the lubricating oil less likely enter the space S2 from the space S1 than in the above-mentioned embodiments. As a result, the semi-floating bearing 7 is more likely to easily supply the lubricating oil individually to the thrust bearing surfaces 7j1 and 7j2 and the radial bearing surfaces 7h1 and 7h2. Therefore, the thrust bearing surfaces 7j1 and 7j2 and the radial bearing surfaces 7h1 and 7h2 can be designed more easily. As a result, the bearing performance of the semi-floating bearing 7 can be improved.

In FIG. 7A, a description is given of the example in which the positioning pin 50 is formed of the elastic member. However, the configuration is not limited to this case, and the bearing structure S may include the hollow member 60 (insertion member) in place of the positioning pin 50 as illustrated in FIG. 7B. In this case, the positioning pin 20 may not be formed of the elastic member. Moreover, the through hole 20a may not be formed in the positioning pin 20.

As illustrated in FIG. 7B, a through hole 61 is formed in the main body portion 7a. The through hole 61 is formed in the small-diameter portion 7f. The through hole 61 is arranged on a side opposite to the oil passage 2c across the shaft 8. The through hole 61 passes through the small-diameter portion 7f from the inner peripheral surface 7c to the outer peripheral surface 7b. An insertion hole 62 is formed in the bearing housing 2. The insertion hole 62 is arranged on a side opposite to the oil passage 2c across the bearing hole 2b. The insertion hole 62 is formed at a position opposed to the through hole 61 and the shaft 8 in the radial direction of the shaft 8. The insertion hole 62 passes through a wall portion having the bearing hole 2b.

A hollow member 60 is inserted through the insertion hole 62 of the bearing housing 2. The hollow member 60 is inserted in a direction intersecting the axial direction of the shaft 8. One end side of the hollow member 60 is inserted through the through hole 61. Another end side of the hollow member 60 is inserted through the insertion hole 62. At least a part of the hollow member 60 is arranged in the insertion hole 62. The hollow member 60 is press-fitted to the through hole 62 from the lower side of FIG. 7B. The hollow member 60 is press-fitted to the through hole 61 from the lower side of FIG. 7B. The hollow member 60 is formed of an elastic member. The hollow member 60 is formed of a member such as rubber is elastically deformable upon the press-fitting.

The hollow member 60 includes a through hole 60a passing from one end to another end. The through hole 60a extends in a longitudinal direction of the hollow member 60. The longitudinal direction of the hollow member 60 is a direction in which the hollow member 60 is inserted into the insertion hole 62 and the through hole 7k. One end of the through hole 60a communicates with (is opened to) the space S2 defined between the small-diameter portion 7f and the shaft 8. The another end of the through hole 60a communicates with (is opened to) the space S3 outside the wall portion having the bearing hole 2b.

The lubricating oil having been supplied to (accumulated in) the space S2 is discharged to the outside of the bearing hole 2b by a through hole 60a formed in the hollow member 60. In such a manner, the through hole for discharging the oil may be formed in the hollow member 60 provided independently of the positioning pin 20. Moreover, through holes may be formed both in the hollow member 60 and the positioning pin 20. A description has been given of the case in which the hollow member 60 is the elastic member, but the material of the hollow member 60 is not particularly limited.

The embodiments have been described above with reference to the attached drawings, but, needless to say, the present disclosure is not limited to the above-mentioned embodiments. It is apparent that those skilled in the art may arrive at various alternations and modifications within the scope of claims, and those examples are construed as naturally falling within the technical scope of the present disclosure.

In the above-mentioned embodiments and modification examples, the description is given of the cases in which the communication holes 22 are formed on the top side (oil passage 2c side) out of the main body portion 7a in the illustrations. However, the communication holes 22 may be formed at any positions of the main body portion 7a in the circumferential direction. Moreover, the arrangement, the size, and the arranged number of the communication holes 22 may appropriately be set in accordance with an operation state of the engine. For example, the communication hole 22 may be arranged at only one location. In this case, an operation time required to machine the communication hole 22 can be reduced. Moreover, the communication holes 22 may be arranged at a plurality of locations, for example, two locations, three locations, or six locations, of the main body portion 7a at equal intervals in the circumferential direction. In this case, it is possible to improve uniformity of an oil film thickness of the lubricating oil in the circumferential direction on the sides of the thrust bearing surfaces 7j1 and 7j2. Moreover, for example, the plurality of communication holes 22 may be arranged at unequal intervals in the circumferential direction in consideration of the rotation direction of the shaft 8 and a centrifugal force so that the oil film thickness of the lubricating oil on the sides of the thrust bearing surfaces 7j1 and 7j2 are as uniform as possible. For example, when the plurality of communication holes 22 are arranged at an equal interval in the circumferential direction, and the oil film thickness of the lubricating oil on the sides of the thrust bearing surfaces 7j1 and 7j2 are not uniform, another communication hole 22 may be added in a region in which the oil film thickness is thin. In this case, the plurality of communication holes 22 are arranged at unequal intervals in the circumferential direction. Moreover, the plurality of communication holes 22 may be unevenly arranged in partial regions in the circumferential direction. Moreover, a sectional shape (a sectional shape perpendicular to the flow of the lubricating oil) of the flow passage of the communication hole 22 is not limited to the circular shape, and may be, for example, an ellipsoidal shape or polygonal shape.

In the above-mentioned embodiments and modification examples, there is given the description that the structure on the thrust bearing surface 7j1 side and the structure on the thrust bearing surface 7j2 side of the main body portion 7a are substantially the same. However, the configuration is not limited to this case, and the structure on the thrust bearing surface 7j1 side and the structure on the thrust bearing surface 7j2 side of the main body portion 7a may be different from each other. For example, the number of the communication holes 22 formed on the turbine impeller 9 side in the main body portion 7a may be larger than the number of the communication holes 22 formed on the compressor impeller 10 side. The temperature of the turbine impeller 9 side tends to increase more than that of the compressor impeller 10 side in the bearing housing 2. Therefore, it is possible to reduce the oil temperature of the lubricating oil supplied to the turbine side by increasing the number of the communication holes 22 on the turbine side more than the number of the communication holes 22 on the compressor side. Moreover, the communication holes 22 may be formed on any one of the thrust bearing surface 7j1 side and the thrust bearing surface 7j2 side.

In the above-mentioned embodiments and modification examples, there is given the description that the thrust bearing surfaces 7j1 and 7j2 are formed on both end surfaces 7d of the main body portion 7a. However, the configuration is not limited to this case, and the thrust bearing surfaces 7j1 and 7j2 may be formed on at least one or both of the end surfaces 7d of the main body portion 7a. A thrust bearing may additionally be provided between the large-diameter portion 7e2 of the main body portion 7a and the oil thrower member 21. The thrust bearing is formed of a member independent of the semi-floating bearing 7. In this case, the end surface 7d of the large-diameter portion 7e1 of the main body portion 7a functions as the thrust bearing surface 7j1. Meanwhile, the end surface 7d of the large-diameter portion 7e2 of the main body portion 7a does not function as the thrust bearing surface 7j2.

Moreover, the above-mentioned embodiments and modification examples may be combined with one another. For example, the second embodiment may be applied to the fourth embodiment so that the oil grooves 30 may be formed in the main body portion 7a of the fourth embodiment. Moreover, the number of the communication holes 22 formed on the turbine impeller 9 side in the main body portion 7a in the second embodiment may be larger than the number of the communication holes 22 formed on the compressor impeller 10 side. Moreover, the number of the communication holes 22 formed on the turbine impeller 9 side in the main body portion 7a in the fourth embodiment may be larger than the number of the communication holes 22 formed on the compressor impeller 10 side. Moreover, the third embodiment may be applied to the second embodiment so that the chamfered portion 40 or the groove 41 may be formed in the main body portion 7a in the second embodiment. For example, the connection portion in which the first oil groove 30a and the second oil groove 30b of the oil groove 30 of the main body portion 7a are connected to each other may include the chamfered portion 40 or the groove 41. Moreover, the third embodiment may be applied to the fourth embodiment so that the chamfered portion 40 or the grooves 41 may be formed in the main body portions 7a in the fourth embodiment. For example, the positioning pin 50 may be formed of the elastic member, and the main body portion 7a may include the chamfered portions 40 or the grooves 41. Alternatively, the hollow member 60 may be formed of the elastic member, and the main body portion 7a may include the chamfered portions 40 or the grooves 41. Alternatively, the positioning pin 50 or the hollow member 60 may be formed of the elastic member, and the main body portion 7a may include the chamfered portions 40 or the grooves 41.

In the above-mentioned embodiments and modification examples, the description is given of the examples in which the oil grooves (for example, oil grooves 23) are formed in the radial bearing surfaces and the thrust bearing surfaces. However, the configuration is not limited to these cases, and the oil grooves may not be formed in the radial bearing surfaces and the thrust bearing surfaces as long as an optimal oil amount can be supplied to the thrust bearing surfaces and the radial bearing surfaces by designing, for example, the shape of the communication holes 22 and the shape of the main body portion 7a.

INDUSTRIAL APPLICABILITY

The present disclosure can be applied to a bearing structure configured to axially support a shaft.

What is claimed is:
1. A bearing structure used in a turbocharger including a turbine and a compressor, the bearing structure, comprising:
    a housing having a bearing hole an an oil passage opened into the bearing hole;
    a bearing member provided in the bearing hole and including a main body portion through which a shaft is inserted;
    a pair of radial bearing surfaces formed on an inner peripheral surface of the main body portion and located on a turbine side and a compressor side, respectively;
    a pair of thrust bearing surfaces formed on end surfaces of the main body portion in an axial direction of the shaft;
    a plurality of communication holes formed on each of the turbine side and the compressor side in the main body portion, each communication hole having one end opened in an outer peripheral surface of the main body portion and another end opened between the thrust bearing surface and the radial bearing surface; and
    an insertion member inserted through an insertion hole of the housing in a direction intersecting the axial direction of the shaft, the insertion member having one end side inserted between the pair of radial bearing surfaces of the main body portion and another end side inserted through the insertion hole, the insertion member having a through hole passing from one end to another end,
    wherein the number of communication holes formed on the turbine side is larger than the number of communication holes formed on the compressor side.

2. The bearing structure according to claim 1, wherein the main body portion includes a first oil groove on each of the turbine side and the compressor side, the first oil groove being formed on the radial bearing surface and extending in the axial direction, and
wherein the first oil groove on the turbine side has one end located on the thrust bearing surface and another end located on the radial bearing surface and the first groove on the compressor side has one end located on the thrust bearing surface and another end located on the radial bearing surface.

3. The bearing structure according to claim 2, wherein the main body portion includes a second oil groove on each of the turbine side and the compressor side, the second oil groove being formed in the thrust bearing surface and extending in a radial direction of the main body portion.

4. The bearing structure according to claim 3, wherein wherein the main body portion further includes a groove formed between the thrust bearing surface and the radial bearing surface and extending in a circumferential direction on the main body portion on each of the turbine side and the compressor side, and the another end of each communication hole being opened within the groove.

5. The bearing structure according to claim 2, wherein wherein the main body portion further includes a groove formed between the thrust bearing surface and the radial bearing surface and extending in a circumferential direction on the main body portion on each of the turbine side and the compressor side, and the another end of each communication hole being opened within the groove.

6. The bearing structure according to claim 1, wherein the main body portion includes an oil groove on each of the turbine side and the compressor side, each oil groove being formed in the thrust bearing surfaces and extending in a radial direction of the main body portion.

7. The bearing structure according to claim 6, wherein wherein the main body portion further includes a groove formed between the thrust bearing surface and the radial bearing surface and extending in a circumferential direction on the main body portion on each of the turbine side and the compressor side, and the another end of each communication hole being opened within the groove.

8. The bearing structure according to claim 1, wherein the main body portion further includes a continuous oil groove on each of the turbine side and the compressor side, each continuous oil groove extending in the radial direction of the main body portion along the thrust bearing surfaces and in the axial direction of the shaft along the radial bearing surfaces, the another end of each communication hole being opened within the continuous oil groove.

9. The bearing structure according to claim 8, wherein
wherein the main body portion further includes a groove formed between the thrust bearing surface and the radial bearing surface and extending in a circumferential direction on the main body portion on each of the turbine side and the compressor side, and the another end of each communication hole being opened within the groove.

10. The bearing structure according to claim 1, wherein the
wherein the main body portion further includes a groove formed between the thrust bearing surface and the radial bearing surface and extending in a circumferential direction on the main body portion on each of the turbine side and the compressor side, and the another end of each communication hole being opened within the groove.

11. The bearing structure according to claim 1, wherein the insertion member is formed of an elastic body.

\* \* \* \* \*